US007792534B2

(12) United States Patent
Wu et al.

(10) Patent No.: US 7,792,534 B2
(45) Date of Patent: Sep. 7, 2010

(54) MULTIPLE THRESHOLD SCHEDULER

(75) Inventors: Jianming Wu, Nepean (CA); Wen Tong, Ottawa (CA); Daniel Boudreau, Hull (CA)

(73) Assignee: Ericsson AB, Stockholm (SE)

( * ) Notice: Subject to any disclaimer, the term of this patent is extended or adjusted under 35 U.S.C. 154(b) by 1915 days.

(21) Appl. No.: 10/164,063

(22) Filed: Jun. 5, 2002

(65) Prior Publication Data

US 2002/0183084 A1 Dec. 5, 2002

Related U.S. Application Data

(60) Provisional application No. 60/296,101, filed on Jun. 5, 2001.

(51) Int. Cl.
*H04W 72/00* (2009.01)
(52) U.S. Cl. .................... 455/452.2; 455/450; 455/509; 455/67.11; 455/423; 370/336; 370/347
(58) Field of Classification Search ...... 455/450–452.2, 455/453, 62, 67.11, 63.1, 509, 423; 370/328–330, 370/252, 338, 412, 468, 347, 336, 442
See application file for complete search history.

(56) References Cited

U.S. PATENT DOCUMENTS

| 5,586,264 A | 12/1996 | Belknap et al. | 395/200.08 |
|---|---|---|---|
| 5,914,735 A | 6/1999 | Yamamoto et al. | 347/33 |
| 5,914,950 A | 6/1999 | Tiedemann, Jr. et al. | 370/348 |
| 6,064,678 A * | 5/2000 | Sindhushayana et al. | 370/470 |
| 6,115,390 A * | 9/2000 | Chuah | 370/443 |
| 6,137,787 A * | 10/2000 | Chawla et al. | 370/337 |
| 6,205,129 B1 * | 3/2001 | Esteves et al. | 370/331 |
| 6,262,980 B1 * | 7/2001 | Leung et al. | 370/336 |
| 6,266,323 B1 | 7/2001 | Valk | 370/230 |
| 6,335,922 B1 * | 1/2002 | Tiedemann et al. | 370/335 |
| 6,336,143 B1 | 1/2002 | Diedrich et al. | 709/231 |

(Continued)

FOREIGN PATENT DOCUMENTS

WO    WO 99/23844    5/1999

(Continued)

OTHER PUBLICATIONS

Bao, Gang, Oses, David Puig, and Holtzman, Jack, "Fairness Criteria for 1xEV-DV with More simulation Results," Qualcomm, Inc., Jan. 24, 2001.

(Continued)

*Primary Examiner*—Sharad Rampuria
(74) *Attorney, Agent, or Firm*—Withrow & Terranova, PLLC (57) ABSTRACT

The present invention provides different scheduling criteria depending on overall system performance in an effort to maintain fairness among mobile terminals and sustain a required QoS level. The invention is particularly effective for multi-carrier systems, wherein scheduling must also take into consideration the carrier used to transmit the scheduled data. In one embodiment, the present invention determines the spread of throughput rates for all mobile terminals being served by a given base station and bases the scheduling criteria thereon. Preferably, a standard deviation calculation is used to measure the throughput spread. The standard deviation of throughput associated with a collective group of mobile terminals is indicative of the differences between the lowest and highest throughputs with respect to the average throughput for the collective group of mobile terminals.

20 Claims, 3 Drawing Sheets

U.S. PATENT DOCUMENTS

| | | | |
|---|---|---|---|
| 6,385,678 B2 | 5/2002 | Jacobs et al. | 710/113 |
| 6,393,012 B1 * | 5/2002 | Pankaj | 370/342 |
| 6,421,335 B1 | 7/2002 | Kilkki et al. | 370/342 |
| 6,493,331 B1 * | 12/2002 | Walton et al. | 370/341 |
| 6,510,509 B1 | 1/2003 | Chopra et al. | 712/13 |
| 6,549,782 B2 * | 4/2003 | Roy | 455/450 |
| 6,601,107 B1 | 7/2003 | Seibert | 709/240 |
| 6,654,374 B1 | 11/2003 | Fawaz et al. | 370/394 |
| 6,657,982 B1 * | 12/2003 | Fong et al. | 370/336 |
| 6,748,222 B1 * | 6/2004 | Hashem et al. | 455/453 |
| 6,785,889 B1 | 8/2004 | Williams | 718/104 |
| 6,788,687 B2 | 9/2004 | Bao et al. | 370/394 |
| 6,795,865 B1 | 9/2004 | Bahl et al. | 709/235 |
| 6,810,503 B1 | 10/2004 | David et al. | 715/500.1 |
| 6,826,193 B1 * | 11/2004 | Peisa | 370/437 |
| 6,845,105 B1 | 1/2005 | Olsson et al. | 370/469 |
| 7,002,918 B1 * | 2/2006 | Prieto et al. | 370/252 |
| 7,139,274 B2 * | 11/2006 | Attar et al. | 370/395.4 |
| 7,280,473 B2 * | 10/2007 | Wu et al. | 370/234 |
| 7,403,488 B2 * | 7/2008 | Gu et al. | 370/252 |
| 7,463,600 B2 * | 12/2008 | Tong et al. | 370/314 |
| 7,463,631 B2 * | 12/2008 | Bao et al. | 370/394 |
| 7,596,089 B2 * | 9/2009 | Bi et al. | 370/232 |
| 2001/0007560 A1 | 7/2001 | Masuda et al. | 370/401 |
| 2001/0033581 A1 * | 10/2001 | Kawarai et al. | 370/468 |
| 2002/0042836 A1 | 4/2002 | Mallory | 709/232 |
| 2002/0176380 A1 * | 11/2002 | Holtzman et al. | 370/329 |
| 2002/0183066 A1 * | 12/2002 | Pankaj | 455/453 |
| 2003/0142656 A1 * | 7/2003 | Padovani et al. | 370/347 |
| 2004/0013089 A1 * | 1/2004 | Taneja et al. | 370/235 |
| 2004/0038686 A1 * | 2/2004 | Buot et al. | 455/453 |
| 2004/0136379 A1 | 7/2004 | Liao et al. | 370/395.21 |

FOREIGN PATENT DOCUMENTS

| | | |
|---|---|---|
| WO | WO 01/54335 A1 | 7/2001 |
| WO | WO 0154335 A1 * | 7/2001 |
| WO | WO 01/76308 A1 | 10/2001 |
| WO | WO 02/45362 A2 | 6/2002 |
| WO | WO 02/085061 A1 | 10/2002 |
| WO | WO 02/089424 A1 | 11/2002 |
| WO | WO 02/091597 A2 | 11/2002 |

OTHER PUBLICATIONS

Jalai, A., Padovani, R., and Pankaj, R., "Data Throughput of CDMA-HDR a High Efficiency-High Data Rate Personal Communication Wireless System," Proc. 2000 IEEE 51st Vehicular Technology Conference, May 15-18, 2000, Tokyo, Japan, pp. 1854-1858, ISBN 0-7803-5718-3.

Love, Robert, "Simulation Results with Regard to Fairness Criteria," Motorola, Inc., 2000.

\* cited by examiner

MAX CIR SCHEDULING

THROUGHPUT SCHEDULING

MULTIPLE THRESHOLD SCHEDULER

This application claims the benefit of provisional application Ser. No. 60/296,101, filed Jun. 5, 2001, the disclosure of which is hereby incorporated by reference in its entirety.

FIELD OF THE INVENTION

The present invention relates to wireless communications, and in particular to scheduling data for transmission from a base station to one or more mobile terminals.

BACKGROUND OF THE INVENTION

Wireless communication networks that allocate communication resources, such as time or frequency, require a scheduler to select data to be transmitted. When multiple users are vying for these resources, the scheduler must analyze the incoming data and determine the data having the highest priority for transmission. Priority has traditionally been based on maximizing overall system throughput or maintaining a certain Quality of Service (QoS) level to ensure that data is transmitted in a timely fashion. When maximizing throughput, users having better channel conditions are favored over those with worse channel conditions. Thus, the users with the less favorable channel conditions are always given lower priority. As a result, those users with poor channel conditions are prone to lower QOS levels. In contrast, trying to maintain certain QOS levels often leads to unnecessarily low system throughput.

Many schedulers prioritize packets based solely on carrier-to-interference ratios (CIRs) derived from information fed back from the mobile terminals. Such schedulers maximize throughput without regard to fairness or minimum throughput requirements and typically schedule delivery for users that are closest to the base station. Schedulers attempting to provide some degree of fairness use rudimentary scheduling criteria resulting in poor system throughput. There are also many problems with existing schedulers in terms of supporting multi-media wireless-internet services. Further, most schedulers are not designed for multi-carrier operation, which makes them unsuitable for multiple carrier—data and voice (MC-DV) environments.

These existing scheduling techniques fail to provide an adaptive scheduling criterion that is capable of evolving to meet the constantly varying demands of the wireless communication environment to optimize throughput while ensuring a defined degree of fairness among users. Accordingly, there is a need for an adaptive scheduling technique to optimize throughput while ensuring fairness among users. There is a further need for a scheduling technique with these capabilities that can optimize multi-carrier diversity in order to maximize overall system throughput while maintaining a desired degree of fairness.

SUMMARY OF THE INVENTION

The present invention provides different scheduling criteria depending on overall system performance in an effort to maintain fairness among mobile terminals and sustain a required QoS level. The invention is particularly effective for multi-carrier systems, wherein scheduling must also take into consideration the carrier used to transmit the scheduled data. In one embodiment, the present invention determines the spread of throughput rates for all mobile terminals being served by a given base station and bases the scheduling criteria thereon. Preferably, a standard deviation calculation is used to measure the throughput spread. The standard deviation of throughput associated with a collective group of mobile terminals is indicative of the differences between the lowest and highest throughputs with respect to the average throughput for the collective group of mobile terminals.

The throughput associated with a high standard deviation indicates that certain mobile terminals are experiencing very low throughput while others are experiencing relatively high throughput, and the potential for unfair scheduling is increased. As such, the scheduling criterion for higher standard deviation in cumulative throughput attempts is to inject higher priority on lower throughput mobile terminals. In contrast, as the standard deviation decreases, when most of the mobile terminals' throughputs are close to the average cumulative throughput, the scheduling criteria should emphasize overall throughput and thus select scheduling for mobile terminals where throughput can be maximized, instead of ensuring that mobile terminals with lower throughput are treated fairly.

When attempting to maximize throughput, maximum carrier-to-interference ratio (CIR) scheduling may be used wherein data is scheduled for a carrier and mobile terminal combination associated with the most favorable channel conditions based on the CIR or the like. Alternatively, proportional fairness scheduling may be used instead of or in combination with the maximum CIR scheduling. Proportional fairness scheduling attempts to take advantage of temporal variations of the channels by scheduling transmissions to the mobile terminals using the carriers associated with the strongest signal levels. Those skilled in the art will recognize other scheduling criteria compatible with the concepts of the present invention.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
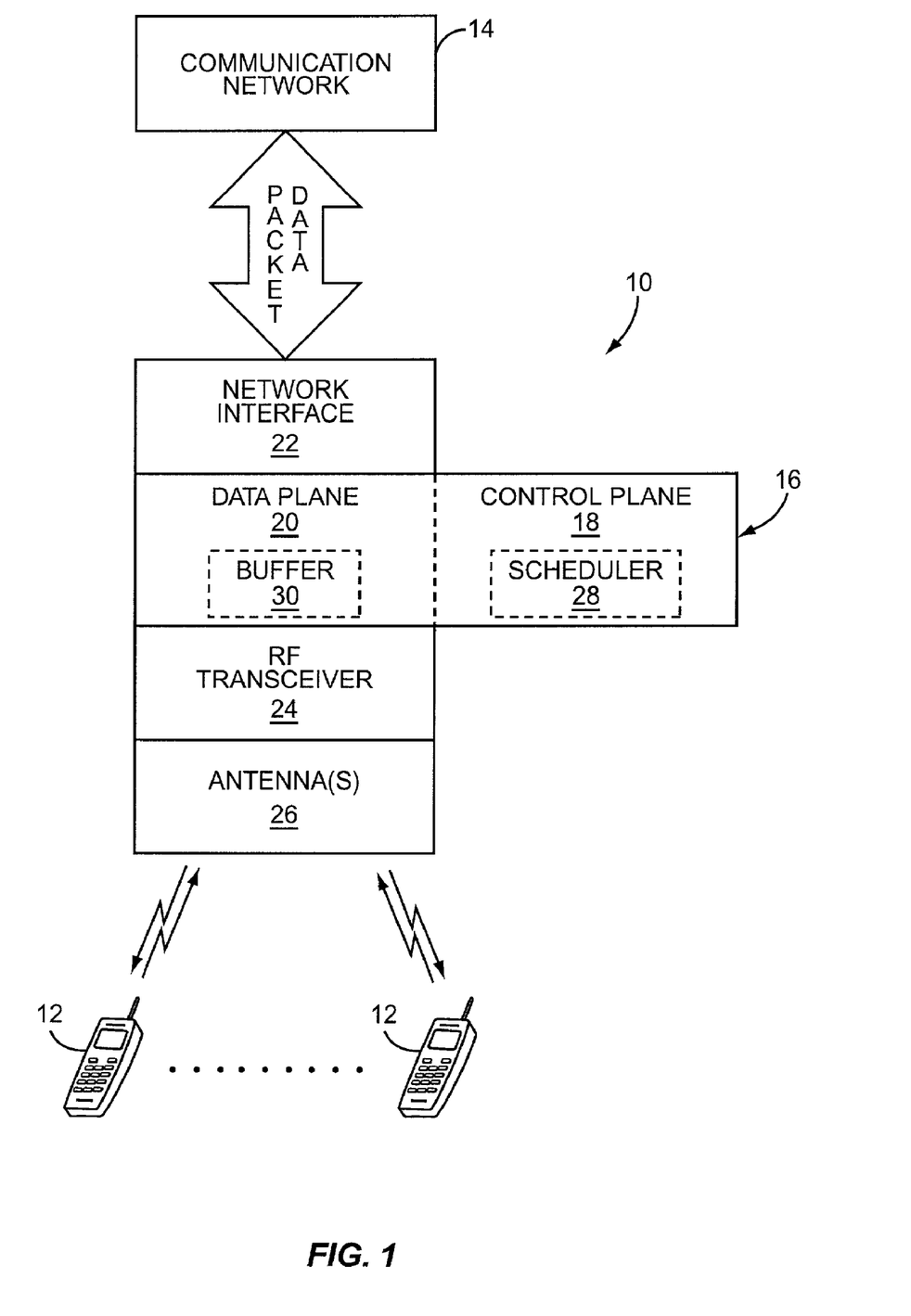
FIG. 1 is a block representation of a wireless communication environment according to one embodiment of the present invention.

With reference to FIG. 1, wireless networks use access points, such as base stations 10, to facilitate communications with access terminals, such as mobile terminals 12, within a select coverage area, or cell. Respective groups of base stations 10 are supported by a communication network 14, which may include mobile switching centers, a public switched telephone network (PSTN), a packet-switched network, or a combination thereof. The communication network 14 is used to transport packets to and from the base station 10. The packets may be communicated in a direct packet-switched manner or on top of a circuit-switched platform. The manner in which the packets are communicated to the base station 10 is not critical to the invention.

During forward link communications from the base station 10 to select mobile terminals 12, the base station 10 must determine the manner and order in which to transmit the data received in the packets from the communication network 14 to the mobile terminals 12. In multiple carrier systems, the base station 10 will also determine the carrier, or channel, on which to deliver the packets. Accordingly, the base station 10 will include a control system 16 having a control plane 18 controlling the flow of data through a data plane 20. For communicating with the mobile terminals 12, the data plane 20 will process packets received from the communication network 14 via a network interface 22 under the control of the control plane 18. The packets are processed into units, which are delivered to radio frequency (RF) transceiver circuitry 24 for transmission. For the sake of clarity, the term "packet" refers to packetized data, which is received by the base station 10 from the communication network 14. The term "unit" refers to packetized data that is transmitted from the base station 10 to the mobile terminals 12. A unit may include all or any part of one or more packets. Although units may directly correspond to packets, units are preferably a given size wherein packets may vary in size from one packet to another. The units may include voice, video, or traditional data.

The forward link from the base station 10 to the mobile terminal 12 will include one or more channels, which are divided into defined time slots. The RF transceiver circuitry 24 is configured to modulate a given unit as dictated by the control plane 18 and transmit the modulated unit via one or more antennas 26 during a single time slot. The RF transceiver circuitry 24 is preferably configured to implement different modulation and coding techniques based on channel conditions, the capabilities of the mobile terminals 12, or required transmission standards. As noted, the RF transceiver circuitry 24 may transmit units over a number of distinct carriers. Those skilled in the art will recognize the various possible modulation techniques and that multiple units may be transmitted in a given time slot.

The control plane 18 includes a scheduler 28, which is configured to prioritize and control the delivery order of units to the mobile terminals 12 based on parameters detailed further below. During operation, packets for any number of mobile terminals 12 are received and stored in a buffer 30 associated with the data plane 20. The buffer 30 is segregated into multiple queues, each associated with a given mobile terminal 12. If the packets do not directly correspond to units, the incoming packets are processed into the desired units. The units are stored in the respective queues in the order in which they are received. Preferably, the queues use a first-in-first-out (FIFO) configuration.

The present invention provides different scheduling criteria depending on overall system performance in an effort to maintain fairness among mobile terminals 12 and sustain a required QoS level. The invention is particularly effective for multi-carrier systems, wherein scheduling must also take into consideration the carrier used to transmit the scheduled data. In one embodiment, the present invention determines the spread of throughput rates for all mobile terminals 12 being served by a given base station 10 and bases the scheduling criteria thereon. Preferably, a standard deviation calculation is used to measure the throughput spread. The standard deviation of throughput associated with the collective group of mobile terminals 12 is indicative of the differences between the lowest and highest throughputs with respect to the average throughput for the collective group of mobile terminals 12. Thus, the throughput associated with a high standard deviation indicates that certain mobile terminals 12 are experiencing very low throughput and very high throughput, and the potential for unfair scheduling is increased. As such, the scheduling criteria for higher standard deviation in cumulative throughput attempts is to inject higher priority on lower throughput mobile terminals 12. In contrast, as the standard deviation decreases, when most of the mobile terminals' throughputs are close to the average cumulative throughput, the scheduling criteria should emphasize overall throughput and thus select scheduling for mobile terminals 12 where throughput can be maximized, instead of ensuring that mobile terminals 12 with lower throughput are treated fairly.

Further details will be provided below after an overview of an exemplary process according to one embodiment of the present invention. With reference to the flow diagram of FIG. 2, operation of the scheduler 28 is illustrated according to one embodiment. On an ongoing basis, the units to transmit are placed in queues for the corresponding mobile terminals 12 (step 100). Further, the scheduler 28 will continuously monitor channel conditions for each carrier and each mobile terminal 12 as reported back from the mobile terminals 12 (step 102). In general, a channel condition represents the quality of the transmission channel from the base station 10 to the mobile terminals 12 for each of the multiple carriers. The throughput rates may be a function of actual or estimated data throughput rates, channel conditions, or a combination thereof.

Figure 2:
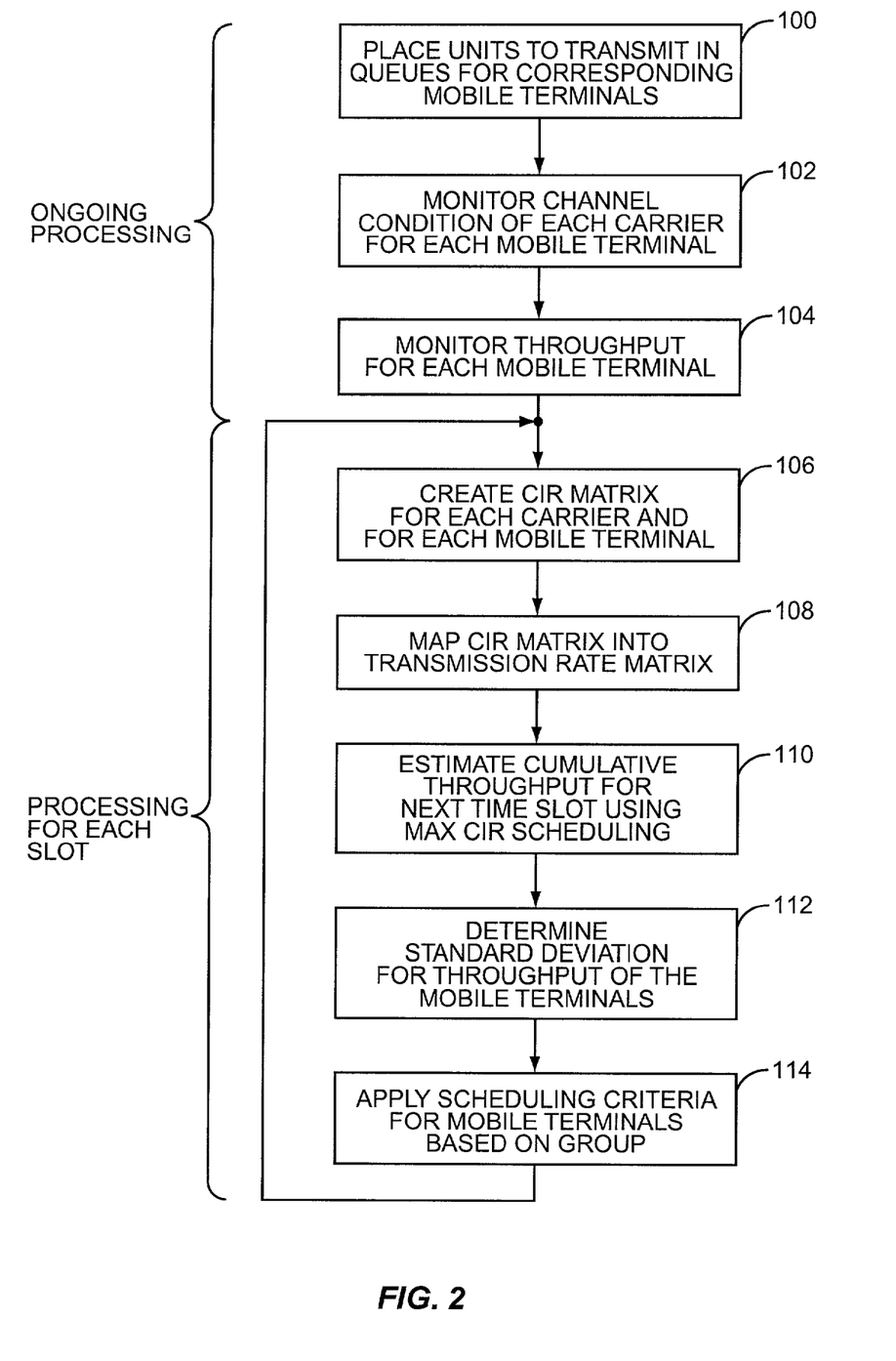
FIG. 2 is a flow diagram according to one embodiment of the present invention.

Channel conditions may vary continuously and may be determined using any number of techniques. For example, carrier-to-interference ratios (CIR), which represent a measure of carrier signal power to interference power, may be fed back to the base station 10 from the mobile terminals 12. The scheduler 28 will preferably continuously track channel conditions for each carrier and mobile terminal 12. The scheduler 28 will also monitor the throughput for each mobile terminal 12 (step 104).

Assume that there are M active mobile terminals 12 served by the base station 10. The cumulated throughput for all mobile terminals 12 in time slot n can be expressed by a vector, $\underline{\Lambda}(n)$, as $$\underline{\Lambda}(n) = [\Lambda_0(n), \Lambda_1(n), \ldots, \Lambda_{M-1}(n)]. \quad Eq.\ 1$$

Due to the channel variations such as path loss, shadow fading and Rayleigh fading, significant variations in throughput may occur between different mobile terminals 12 at any given time. These variations seriously degrade the throughput performance and the QoS associated therewith. To evaluate throughput performance, the standard deviation, $\sigma_{th}(n)$, of cumulated throughput for all mobile terminals 12 in time slot n, is determined. The standard deviation for cumulative throughput, $\sigma_{th}(n)$, is defined as follows:

$$\sigma_{th}(n) = \sqrt{\frac{1}{M} \sum_{m=0}^{M-1} \{\Lambda_m(n) - \mu(n)\}^2}, \quad \text{Eq. 2}$$

where $\mu(n)$ is the mean of cumulated throughput for time slot n, as given by $$\mu(n) = \frac{1}{M} \sum_{m=0}^{M-1} \Lambda_m. \quad \text{Eq. 3}$$

To calculate the standard deviation $\sigma_{th}(n)$, each mobile terminal 12 monitors the channel conditions of N separate carriers using N common pilot signals and determines N separated CIRs. The CIRs are then sent to the base station 10. The base station 10 will create a CIR matrix, $\underline{\Gamma}(n)$ (step 106), which can be expressed as $$\underline{\Gamma}(n) = \begin{bmatrix} \Gamma_{0,0}(n) & \Gamma_{0,1}(n) & \cdots & \Gamma_{0,M-1}(n) \\ \Gamma_{1,0}(n) & \Gamma_{1,1}(n) & \cdots & \Gamma_{1,M-1}(n) \\ \vdots & \vdots & \ddots & \vdots \\ \Gamma_{N-1,0}(n) & \Gamma_{N-1,1}(n) & \cdots & \Gamma_{N-1,M-1}(n) \end{bmatrix}. \quad \text{Eq. 4}$$

Based on the adaptive modulation and coding (AMC) associated with the respective channel conditions, the CIR matrix can be mapped into a transmission rate matrix, $\underline{R}$, which is indicative of the potential throughput for each mobile terminal 12 and each carrier (step 108). The transmission rate matrix, $\underline{R}$, can be expressed as $$\underline{R}(n) = \begin{bmatrix} R_{0,0}(n) & R_{0,1}(n) & \cdots & R_{0,M-1}(n) \\ R_{1,0}(n) & R_{1,1}(n) & \cdots & R_{1,M-1}(n) \\ \vdots & \vdots & \ddots & \vdots \\ R_{N-1,0}(n) & R_{N-1,1}(n) & \cdots & R_{N-1,M-1}(n) \end{bmatrix}. \quad \text{Eq. 5}$$

By using the resulting transmission rate matrix, $\underline{R}(n)$, as well as the maximum CIR user scheduling, the scheduler 28 can estimate the cumulated user throughput in the next time slot n (step 110), as given by $$\underline{\hat{\Lambda}}(n) = [\hat{\Lambda}_0(n), \hat{\Lambda}_1(n), \ldots, \hat{\Lambda}_{M-1}(n)] \quad \text{Eq. 6}$$

where $$\hat{\Lambda}_m(n) = \Lambda_m(n-1) + \sum_{k=0}^{N-1} \alpha_{k,m}(n) \cdot R_{k,m}(n) \quad \text{Eq. 7}$$

and where $\alpha_{k,m}(n)=1$ for an active kth carrier for the mth user and $\alpha_{k,m}(n)=0$ for an inactive kth carrier for the mth user. Or $\alpha_{k,m}(n)=p$ for an active kth carrier for the mth user and $\alpha_{k,m}(n)=1-p$ for an inactive kth carrier for the mth user, p is a positive number less than unit. Using the estimated throughputs, $\hat{\Lambda}_m(n)$, the scheduler 28 can readily obtain the standard deviation of the estimated throughput, $\hat{\sigma}_{th}(n)$ (step 112) and will then schedule units for transmission for select mobile terminals 12 and on select carriers using scheduling criteria selected based on the standard deviation of the estimated throughput, $\hat{\sigma}_{th}(n)$ (step 114).

Figure 3A:
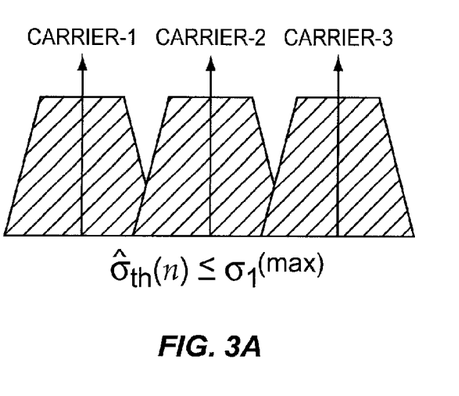
FIGS. 3A through 3D illustrate four scheduling modes according to one embodiment of the present invention.
Figure 3B:
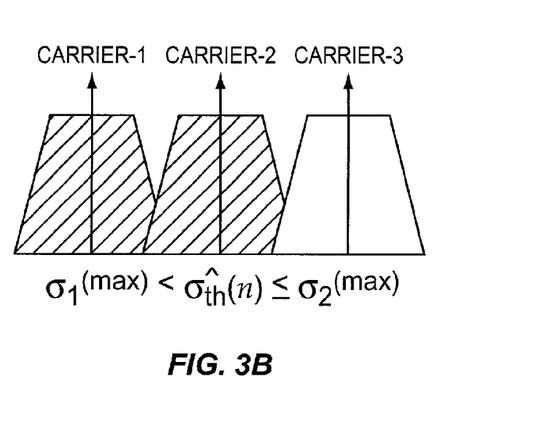
Figure 3C:
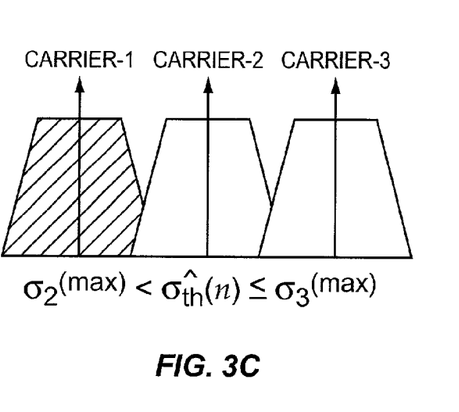
Figure 3D:
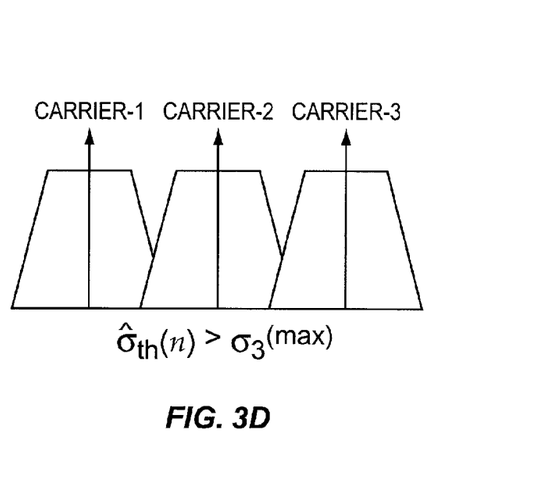

For example, a detailed multiple-threshold (N=3) adaptive scheduling criteria is described below in three-carrier environment. With three thresholds, there are four categories of scheduling criteria. In the example, maximum CIR scheduling indicates the scheduler will systematically select the carrier and mobile terminal 12 having the greatest CIR until each available carrier has a unit scheduled for transmission for the given time slot n. The exemplary scheduling criteria follows in association with FIGS. 3A-3D:

If $\hat{\sigma}_{th}(n) \leq \sigma_1^{(max)}$, use maximum CIR scheduling for each of the three carriers (FIG. 3A);

If $\sigma_1^{(max)} < \hat{\sigma}_{th}(n) \leq \sigma_2^{(max)}$, identify a mobile terminal 12 with the least received throughput and allocate one slot on the best carrier for the identified mobile terminal 12. Apply maximum CIR scheduling for the remaining two carriers (FIG. 3B);

If $\sigma_2^{(max)} < \hat{\sigma}_{th}(n) \leq \sigma_3^{(max)}$, identify two mobile terminals 12 with the least received throughput and allocate two slot on the first and second best carriers for these mobile terminals 12. Apply maximum CIR scheduling to the remaining carrier (FIG. 3C); and If $\hat{\sigma}_{th}(n) > \sigma_3^{(max)}$, identify three mobile terminals 12 with the least received throughput and allocate three slots on the carriers for these mobile terminals 12. No maximum CIR user scheduling is applied (FIG. 3D).

Here, $\sigma_k^{(max)}$ is the threshold of standard deviation of throughput, whereby streaming service performance can be easily controlled under a desired level of $\sigma_N^{(max)}$, for k=1, 2, ..., N.

In order to define the threshold of standard deviation of throughput $\sigma_k^{(max)}$, two values, $\sigma_L$ and $\sigma_H$ are set. If $\hat{\sigma}_{th}(n) \leq \sigma_L$, the maximum CIR scheduling should be utilized, while if $\hat{\sigma}_{th(n)} > \sigma_H$, the maximum CIR scheduling has to be terminated. As an example, the threshold of standard deviation of throughput $\sigma_k^{(max)}$ is determined based on both $\sigma_L$ and $\sigma_H$, and represented by:

$$\sigma_k^{(max)} = \sigma_L + (k-1) \cdot \left(\frac{\sigma_H - \sigma_L}{N-1}\right), \text{ for } k = 1, 2, \ldots, N. \quad \text{Eq. 8}$$

As seen from the above, the present invention looks at the spread for throughput across multiple users to determine a scheduling criteria. As the spread decreases, the amount of CIR scheduling increases. As the spread increases, lower throughput mobile terminals are prioritized during scheduling. Although the above example implements standard deviation to provide a statistical analysis for the relative spread for the throughput of each mobile terminal 12, those skilled in the art will recognize other techniques and algorithms to use for analyzing the relative spread for throughput and selecting scheduling criteria based thereon.

As an alternative to the maximum CIR scheduling described above, proportional fairness scheduling may be used. Proportional fairness scheduling attempts to take advantage of temporal variations of the channels by scheduling transmissions to the mobile terminals 12 using the carriers associated with the strongest signal levels. For example, the mobile terminals 12 may request certain data rates based on signal levels or channel quality, and the base station 10 will send the data to the mobile terminal 12 based on the requested data rate. When proportional fairness scheduling is required, data is scheduled for transmission to the mobile terminals 12 based on a ratio of the requested data rate to an average throughput rate over a given window. The latter favors those mobile terminals with better capability to transmit larger volumes of data.

These aspects of the invention can be implemented using alternative equations and relationships than those described in detail above. Those skilled in the art will recognize improvements and modifications to the preferred embodiments of the present invention. All such improvements and modifications are considered within the scope of the concepts disclosed herein and the claims that follow.

What is claimed is:

1. A method for scheduling data for transmission to mobile terminals in a wireless communication environment comprising:
   determining a relative throughput spread among the mobile terminals;
   selecting one of a plurality of scheduling criteria based on the relative throughput spread; and
   scheduling transmission of units for certain ones of the mobile terminals based on the selected scheduling criteria.

2. The method of claim 1 wherein communications with the mobile terminals take place using one of n carriers.

3. The method of claim 2 wherein a first of the plurality of scheduling criteria for a higher throughput spread requires selecting at least one of the mobile terminals associated with a lower throughput and scheduling transmission of a unit to the at least one mobile terminal on a carrier associated with the best channel condition or strongest signal level.

4. The method of claim 3 wherein a second of the plurality of scheduling criteria for a lower throughput spread requires selecting at least one of the remaining mobile terminals and scheduling transmission of a unit to the at least one of the remaining mobile terminals on the carrier associated with the best channel condition or strongest signal levels.

5. The method of claim 2 wherein:
   a) a first one of the plurality of scheduling criteria for a low throughput spread requires scheduling transmission of units to select ones of the mobile terminals on carriers associated with the best channel conditions or strongest signal levels;
   b) an intermediate one of the plurality of scheduling criteria for an intermediate throughput spread requires selecting at least one of the mobile terminals associated with a lower throughput and scheduling transmission of a unit to the at least one mobile terminal on the carrier associated with the best channel conditions or strongest signal levels; and
   c) a final one of the plurality of scheduling criteria for a high throughput spread requires selecting mobile terminals associated with the lowest throughput and scheduling transmission of units to the select mobile terminals on carriers associated with the best channel conditions or strongest signal levels.

6. The method of claim 2 wherein the relative throughput spread is determined by calculating a standard deviation of cumulative throughputs for the mobile terminals.

7. The method of claim 6 further comprising:
   a) determining channel conditions for each mobile terminal and each carrier;
   b) estimating transmission rates for each mobile terminal and each carrier based on the corresponding channel conditions and coding and modulation rates;
   c) estimating cumulative throughputs for each mobile terminal; and
   d) determining the standard deviation of the cumulative throughputs.

8. The method of claim 2 wherein:
   a) a first of the scheduling criteria uses maximum carrier-to-interference ratio or proportional fairness scheduling for each carrier; and
   b) a second of the scheduling criteria selects at least one mobile terminal associated with a lower throughput and schedules transmission of a unit for the at least one mobile terminal on a best available carrier wherein scheduling for remaining mobile terminals uses maximum carrier-to-interference ratio or proportional fairness scheduling.

9. The method of claim 8 wherein scheduling for a third of the scheduling criteria selects n of the mobile terminals with the lowest throughput and schedules transmission of units for the selected mobile terminals on the best available carriers.

10. A system for scheduling data for transmission to mobile terminals in a wireless communication environment comprising a control plane and scheduler adapted to:
    a) determine a relative throughput spread among the mobile terminals;
    b) select one of a plurality of scheduling criteria based on the throughput spread; and
    c) schedule transmission of units for certain ones of the mobile terminals based on the selected scheduling criteria.

11. The system of claim 10 wherein communications with the mobile terminals take place using one of n carriers.

12. The system of claim 11 wherein a first of the plurality of scheduling criteria for a higher throughput spread requires selecting at least one of the mobile terminals associated with a lower throughput and scheduling transmission of a unit to the at least one mobile terminal on a carrier associated with the best channel condition or strongest signal level.

13. The system of claim 12 wherein a second of the plurality of scheduling criteria for a lower throughput spread requires selecting at least one of the remaining mobile terminals and scheduling transmission of a unit to the at least one of the remaining mobile terminals on the carrier associated with the best channel condition or strongest signal level.

14. The system of claim 11 wherein:
    a) a first one of the plurality of scheduling criteria for a low throughput spread requires scheduling transmission of units to select ones of the mobile terminals on carriers associated with the best channel conditions;
    b) an intermediate one of the plurality of scheduling criteria for an intermediate throughput spread requires selecting at least one of the mobile terminals associated with a lower throughput and scheduling transmission of a unit to the at least one mobile terminal on the carrier associated with the best channel conditions or strongest signal levels; and
    c) a final one of the plurality of scheduling criteria for a high throughput spread requires selecting mobile terminals associated with the lowest throughput and scheduling transmission of units to the select mobile terminals on carriers associated with the best channel conditions or strongest signal levels.

15. The system of claim 11 wherein the relative throughput spread is determined by calculating a standard deviation of cumulative throughputs for the mobile terminals.

16. The system of claim 15 wherein the control plane and scheduler are further adapted to:
    a) determine channel conditions for each mobile terminal and each carrier;

b) estimate transmission rates for each mobile terminal and each carrier based on the corresponding channel conditions and coding and modulation rates;

c) estimate cumulative throughputs for each mobile terminal; and d) determine the standard deviation of the cumulative throughputs.

17. The system of claim 11 wherein:

a) a first of the scheduling criteria uses maximum carrier-to-interference ratio or proportional fairness scheduling for each carrier; and b) a second of the scheduling criteria selects at least one mobile terminal associated with a lower throughput and schedules transmission of a unit for the at least one mobile terminal on a best available carrier wherein scheduling for remaining mobile terminals uses maximum carrier-to-interference ratio or proportional fairness scheduling.

18. The system of claim 17 wherein scheduling for a third of the scheduling criteria selects n of the mobile terminals with the lowest throughput and schedules transmission of, units for the selected mobile terminals on the best available carriers.

19. A method for scheduling data for transmission to mobile terminals in a wireless communication environment comprising:

a) determining a standard deviation of an estimated throughput for a subsequent time slot among a plurality of mobile terminals over a plurality of carriers;

b) selecting one of a plurality of scheduling criteria based on the standard deviation; and c) scheduling transmission of units for certain ones of the mobile terminals based on the selected scheduling criteria for the subsequent time slot for each of the plurality of carriers.

20. The method of claim 19 wherein at least one of the plurality of scheduling criteria prioritizes scheduling for at least one of the plurality of mobile terminals having lowest throughput rates and schedules at least one of the plurality of mobile terminals associated with a best channel condition or strongest signal level for one of the remaining carriers.

* * * * *

UNITED STATES PATENT AND TRADEMARK OFFICE
CERTIFICATE OF CORRECTION

PATENT NO. : 7,792,534 B2
APPLICATION NO. : 10/164063
DATED : September 7, 2010
INVENTOR(S) : Wu et al.

It is certified that error appears in the above-identified patent and that said Letters Patent is hereby corrected as shown below:

On Page 2, in Field (56), under "FOREIGN PATENT DOCUMENTS", in Column 2, Line 1, delete "WO    WO 01/54335 A1    7/2001".

In Column 1, Line 28, delete "QOS" and insert -- QoS --, therefor.

In Column 1, Line 29, delete "QOS" and insert -- QoS --, therefor.

In Column 5, Lines 24-28, in Eq. 4, delete "
$$\begin{bmatrix} \Gamma_{0,0}(n) & \Gamma_{0,1}(n) & \cdots & \Gamma_{0,M-1}(n) \\ \Gamma_{1,0}(n) & \Gamma_{1,1}(n) & \cdots & \Gamma_{1,M-1}(n) \\ \vdots & \vdots & \ddots & \vdots \\ \Gamma_{N-1,0}(n) & \Gamma_{N-1,1}(n) & \cdots & \Gamma_{N-1,M-1}(n) \end{bmatrix}.$$
" and insert --
$$\begin{bmatrix} \Gamma_{0,0}(n) & \Gamma_{0,1}(n) & \cdots & \Gamma_{0,M-1}(n) \\ \Gamma_{1,0}(n) & \Gamma_{1,1}(n) & \cdots & \Gamma_{1,M-1}(n) \\ \vdots & \vdots & \ddots & \vdots \\ \Gamma_{N-1,0}(n) & \Gamma_{N-1,1}(n) & \cdots & \Gamma_{N-1,M-1}(n) \end{bmatrix}.$$
--, therefor.

In Column 5, Lines 39-43, in Eq. 5, delete "
$$\begin{bmatrix} R_{0,0}(n) & R_{0,1}(n) & \cdots & R_{0,M-1}(n) \\ R_{1,0}(n) & R_{1,1}(n) & \cdots & R_{1,M-1}(n) \\ \vdots & \vdots & \ddots & \vdots \\ R_{N-1,0}(n) & R_{N-1,1}(n) & \cdots & R_{N-1,M-1}(n) \end{bmatrix}.$$
" and Signed and Sealed this
Nineteenth Day of February, 2013

Teresa Stanek Rea
*Acting Director of the United States Patent and Trademark Office*

CERTIFICATE OF CORRECTION (continued)
U.S. Pat. No. 7,792,534 B2 insert -- $\begin{bmatrix} R_{0,0}(n) & R_{0,1}(n) & \cdots & R_{0,M-1}(n) \\ R_{1,0}(n) & R_{1,1}(n) & \cdots & R_{1,M-1}(n) \\ \vdots & \vdots & \ddots & \vdots \\ R_{N-1,0}(n) & R_{N-1,1}(n) & \cdots & R_{N-1,M-1}(n) \end{bmatrix}$ --, therefor.

In Column 6, Line 37, delete "$\hat{\sigma}_{th(n)>\sigma H}$," and insert -- $\hat{\sigma}_{th}(n) > \sigma_H$ --, therefor.

In Column 10, Line 1, in Claim 18, delete "of," and insert -- of --, therefor.